United States Patent
Brinas

(10) Patent No.: US 9,248,770 B2
(45) Date of Patent: Feb. 2, 2016

(54) ADAPTABLE BIN WITH ROTATING CUP HOLDER

(71) Applicant: GM GLOBAL TECHNOLOGY OPERATIONS LLC, Detroit, MI (US)

(72) Inventor: Gerard Brinas, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 290 days.

(21) Appl. No.: 13/858,155

(22) Filed: Apr. 8, 2013

(65) Prior Publication Data

US 2014/0299641 A1 Oct. 9, 2014

(51) Int. Cl.
*B60R 7/00* (2006.01)
*B60R 9/00* (2006.01)
*B60N 3/10* (2006.01)

(52) U.S. Cl.
CPC ............... *B60N 3/102* (2013.01); *B60N 3/101* (2013.01); *B60N 3/106* (2013.01)

(58) Field of Classification Search
CPC ......... B60N 3/102; B60N 3/106; B60N 3/101
USPC ................. 224/282, 275, 926, 552, 553, 570; 220/737; 248/311.2; 297/188.01, 297/188.14
See application file for complete search history.

(56) References Cited

U.S. PATENT DOCUMENTS

| | | | | |
|---|---|---|---|---|
| 4,828,211 A * | 5/1989 | McConnell | ............. | B60N 3/106 211/75 |
| 5,167,392 A * | 12/1992 | Henricksen | ............. | B60N 3/102 248/311.2 |
| 5,318,266 A * | 6/1994 | Liu | ............. | A47K 1/09 248/292.12 |
| 5,318,343 A * | 6/1994 | Spykerman | ............. | B60N 3/106 297/188.16 |
| 5,527,008 A * | 6/1996 | Schutter et al. | ............. | 248/311.2 |
| 5,603,477 A * | 2/1997 | Deutsch | ............. | B60N 3/102 248/292.12 |
| 5,671,877 A * | 9/1997 | Yabuya | ............. | B60N 3/106 224/282 |
| 5,692,658 A * | 12/1997 | Fischer et al. | ............. | 224/281 |
| 5,876,007 A * | 3/1999 | Lancaster et al. | ............. | 248/311.2 |
| 5,897,089 A * | 4/1999 | Lancaster | ............. | B60N 3/102 224/926 |
| 6,047,937 A * | 4/2000 | Huang | ............. | B60N 3/102 248/311.2 |
| 6,431,516 B1 * | 8/2002 | Cooner, Jr. | ............. | B60N 3/101 248/311.2 |
| 6,843,397 B2 * | 1/2005 | Then | ............. | B60N 2/0224 224/552 |
| 6,932,311 B2 * | 8/2005 | DeVries | ............. | B60N 3/102 224/926 |
| 7,036,785 B2 * | 5/2006 | Moyer et al. | ............. | 248/311.2 |
| 7,121,517 B2 * | 10/2006 | Oana | ............. | B60N 3/102 224/281 |
| 8,695,843 B1 * | 4/2014 | Brinas | ............. | B60N 3/102 220/737 |
| 2003/0205596 A1 * | 11/2003 | Ling | ............. | 224/275 |
| 2009/0159623 A1 * | 6/2009 | Kreutmayr | ............. | 224/282 |
| 2011/0030217 A1 * | 2/2011 | Morino | ............. | H01L 23/473 29/890.03 |

FOREIGN PATENT DOCUMENTS

DE 102010048095 A1 * 4/2012 ............... B60N 3/10

* cited by examiner

*Primary Examiner* — J. Gregory Pickett
*Assistant Examiner* — Lester L Vanterpool
(74) *Attorney, Agent, or Firm* — Quinn Law Group, PLLC

(57) ABSTRACT

A rotating cup holder includes a static sidewall forming part of the cup holder and a dynamic sidewall forming part of the cupholder. The static sidewall includes a plurality of guide tracks and a landing support between the plurality of guide tracks. The dynamic sidewall is rotatable between a collapsed state and an expanded state. The dynamic sidewall includes a plurality of ribs slidably disposed within the guide tracks of the static sidewall while the dynamic sidewall is in the collapsed state. The ribs extend away from the guide tracks in the expanded state. The dynamic sidewall also includes at least one end connector linking an adjacent pair of the ribs. The end connector rests on the landing support of the static sidewall in the expanded state.

11 Claims, 4 Drawing Sheets

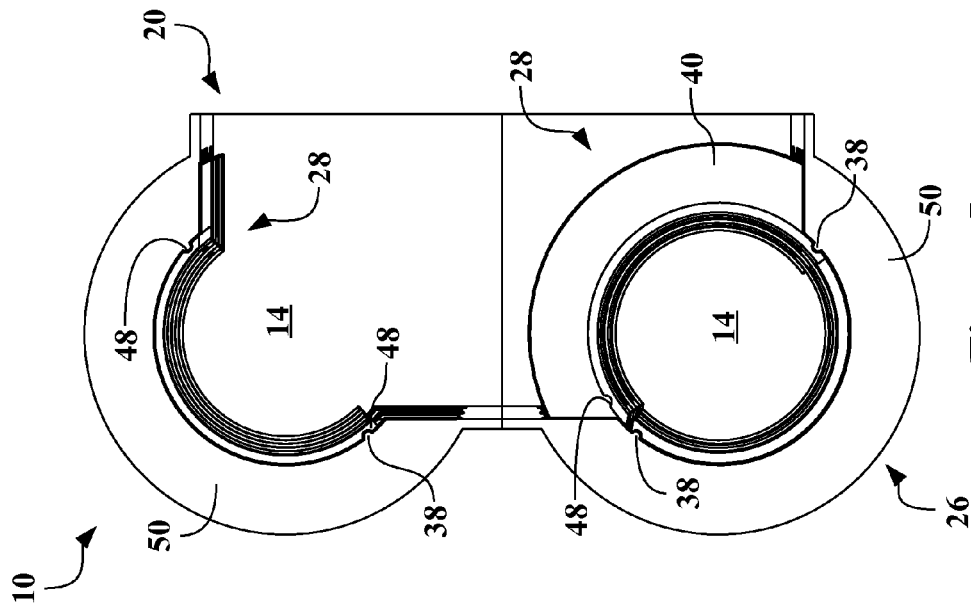
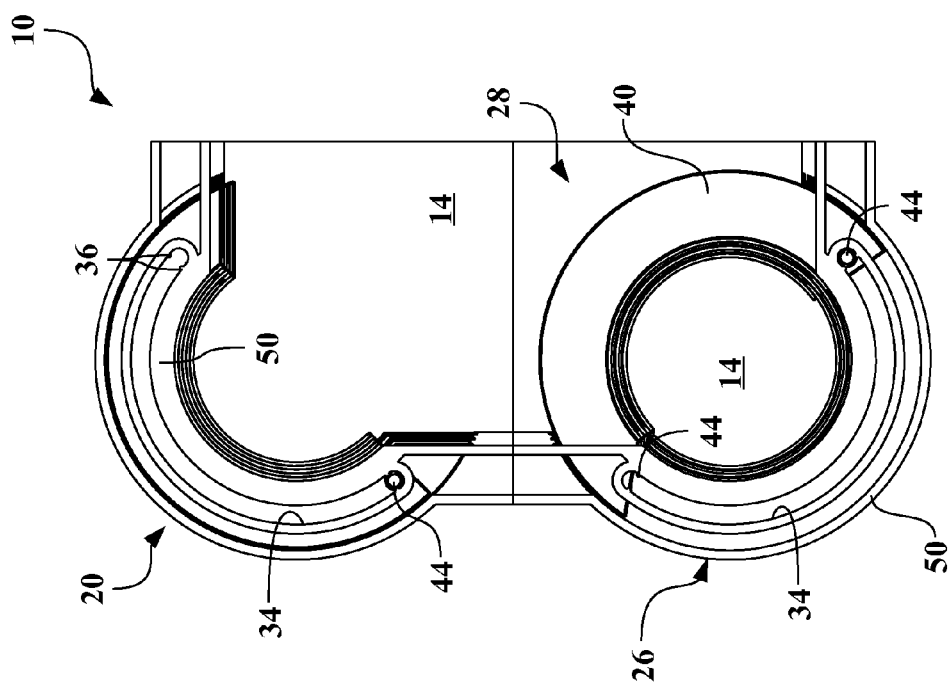

ADAPTABLE BIN WITH ROTATING CUP HOLDER

TECHNICAL FIELD

This disclosure relates to storage bins and cup holders, particularly those used in vehicles.

BACKGROUND

Storage bins may be used to hold various items in the vehicle, including electronics, vehicle accessories, or personal items. Some vehicles may include one or more cup holders designed to support and grasp liquid containers used by occupants within the vehicle.

SUMMARY

A rotating cup holder is provided. The cup holder includes a static sidewall forming part of the cup holder. The static sidewall includes a plurality of guide tracks and a landing support between the plurality of guide tracks.

The cup holder also includes a dynamic sidewall, which is rotatable between a collapsed state and an expanded state. In the collapsed state, the dynamic sidewall is substantially within the static sidewall. In the expanded state, the dynamic sidewall is extended away from the static sidewall.

The dynamic sidewall includes a plurality of ribs slidably disposed within the guide tracks of the static sidewall while the dynamic sidewall is in the collapsed state. The ribs extend away from the guide tracks in the expanded state. The dynamic sidewall also includes at least one end connector linking an adjacent pair of the ribs. The end connector rests on the landing support of the static sidewall in the expanded state.

The above features and advantages, and other features and advantages, of the present invention are readily apparent from the following detailed description of some of the best modes and other embodiments for carrying out the invention, which is defined solely by the appended claims, when taken in connection with the accompanying drawings.

BRIEF DESCRIPTION OF THE DRAWINGS

FIG. 4 is a schematic top view of a portion of the adaptable bin shown in FIGS. 1-3, having a top plate removed and illustrated with one cup holder expanded and the other cup holder collapsed; and FIG. 5 is a schematic top view of a portion of the adaptable bin shown in FIGS. 1-4, illustrated with one cup holder expanded and the other cup holder collapsed.

DETAILED DESCRIPTION

Figure 1:
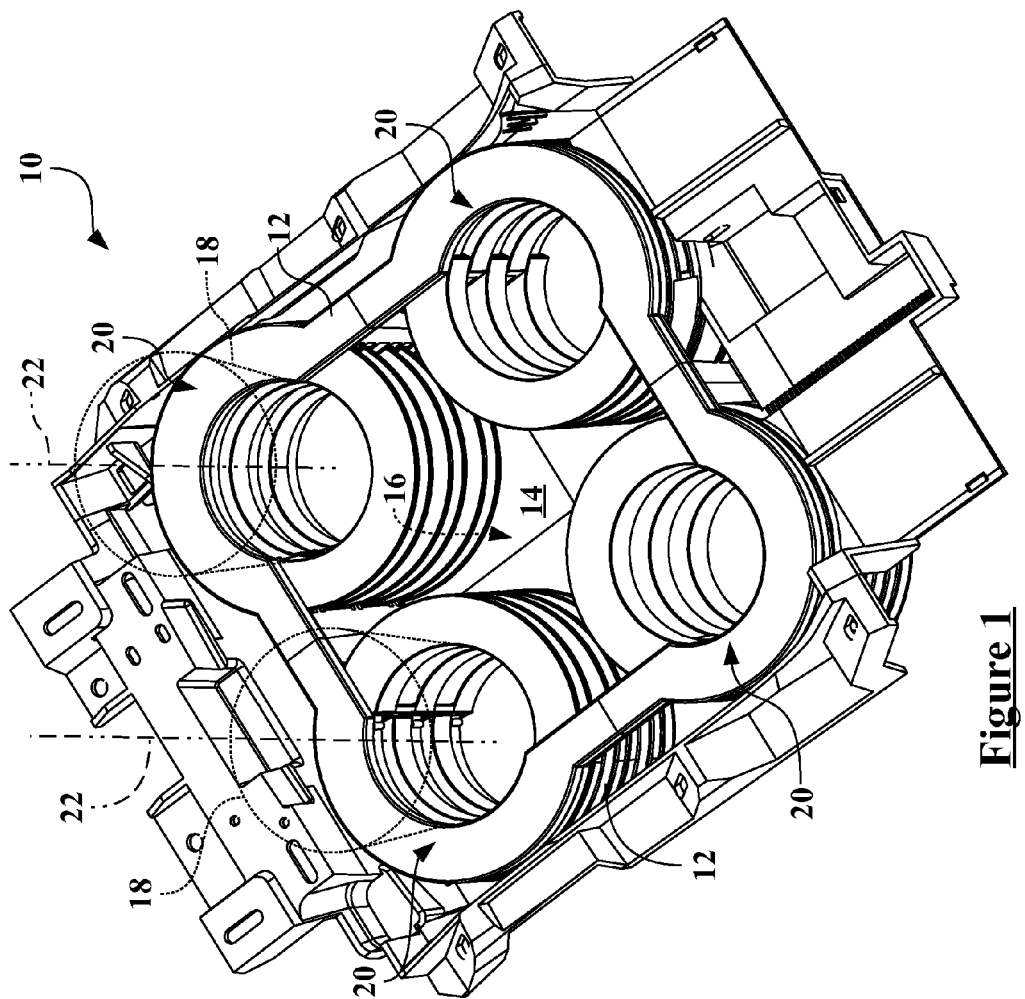
FIG. 1 is a schematic isometric view of an adaptable bin holding four cups in four rotating cup holders.

Referring to the drawings, like reference numbers correspond to like or similar components wherever possible throughout the several figures. FIG. 1 shows an adaptable bin 10 for a vehicle (not shown), which may be used for storage of numerous objects or components. The adaptable bin 10 may be located in the passenger compartment or elsewhere within the vehicle.

While the present invention may be described with respect to automotive or vehicular applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Features shown in one figure may be combined with, substituted for, or modified by, features shown in any of the figures. Unless stated otherwise, no features, elements, or limitations are mutually exclusive of any other features, elements, or limitations. Any specific configurations shown in the figures are illustrative only and the specific configurations shown are not limiting of the claims or the description. All elements may be mixed and matched between figures.

The adaptable bin 10 includes a bin wall 12 and a bin floor 14, which cooperate to define a storage volume 16. The storage volume 16 is illustratively shown by dashed lines approximating the edges of the storage volume 16 defined by the portions of the bin floor 14 and the bin wall 12 shown. Therefore, based upon the configuration of the bin wall 12 and the bin floor 14, the storage volume 16 may vary in size and shape from that illustrated in the figures. Importantly, the storage volume 16 may be partially defined by adjacent components, some of which may function as, or form, portions of the bin wall 12.

In the configuration shown, the bin wall 12 and the bin floor 14 are generally perpendicular to one another. However, the bin wall 12 and the bin floor 14 need not be perpendicular and in many cases the bin wall 12 will have an obtuse angle relative to the bin floor 14. The bin wall 12 and the bin floor 14 are also shown intersecting at substantially right angles. However, many production versions of the adaptable bin 10 will include fillets, bosses, or other protrusions into the storage volume 16 at, or near, the intersection of the bin wall 12 and the bin floor 14.

In FIG. 1, the adaptable bin 10 is configured to hold one or more cups 18 at least partially within the storage volume 16. Each cup 18 is disposed within a retracting or rotating cup holder 20 (which may be referred to herein simply as a cup holder 20).

While four cup holders 20 and cups 18 are shown in FIG. 1, additional or fewer cups 18 may be placed or stored within the storage volume 16, depending upon the configuration and the number of cup holders 20 incorporated therein. The storage volume 16 substantially encapsulates all of the cup holders 20, such that the rotating cup holders 20 selectively block or occupy a portion of the storage volume 16. The cup holders 20 may be numbered, such a first through a fourth cup holder 20, but any numbering is for illustrative purposes only.

A cup holder axis 22 (which may be referred to herein simply as the axis 22) is substantially central to the cup holders 20. As described herein, the cup holders 20 may be selectively moved between collapsed states (not shown in FIG. 1) and expanded states (shown in FIG. 1). In some embodiments of the adaptable bin 10, portions of the cup holders 20 may be extended slightly above the bin wall 12, such that a small portion of the cup holders 20 may be above the storage volume 16.

In the adaptable bin 10 shown, each of the cup holders 20 is substantially symmetric about its respective axis 22. However, one or more of the cup holders 20 may be asymmetric. For example, the upper portion of the cup holder 20 may extend further from the bin wall 12 into the storage volume 16 to allow for larger containers or for cups 18 having handles.

Figure 2A:
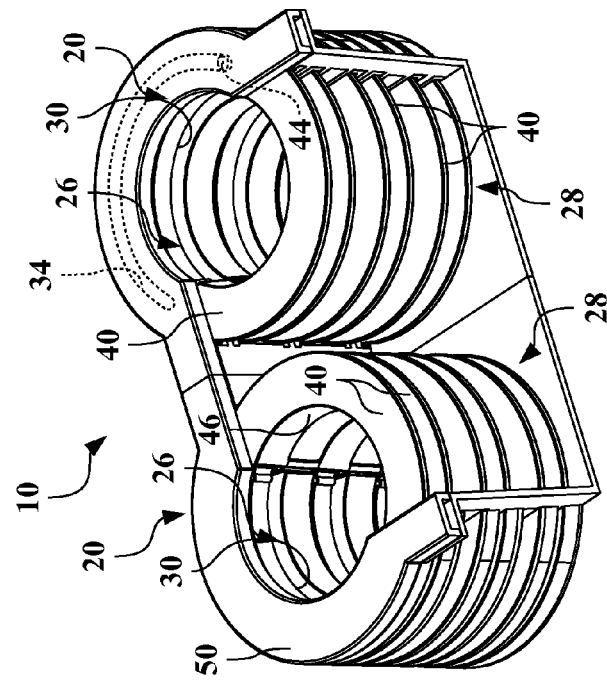
FIG. 2A is a schematic isometric view of the adaptable bin of FIG. 1, shown with the cups removed to illustrate the rotating cup holders, which are in a collapsed state.
Figure 2B:
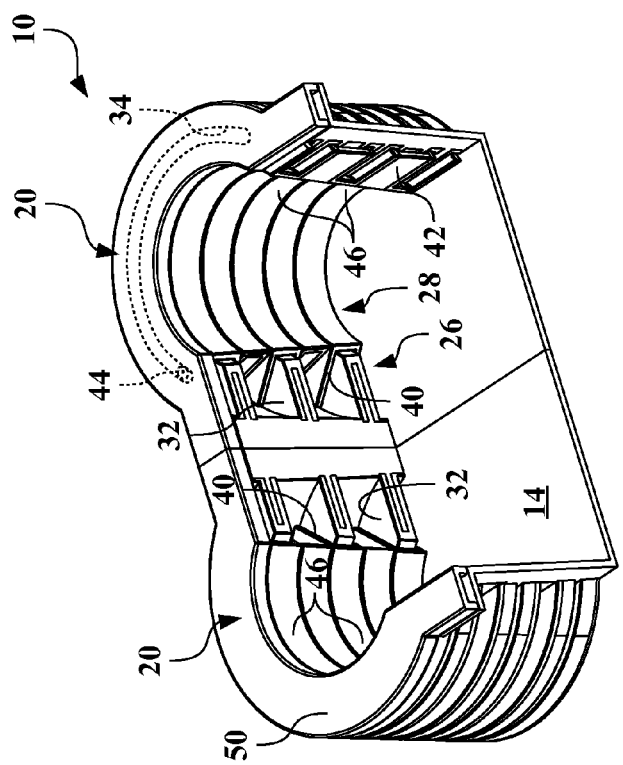
FIG. 2B is a schematic isometric view of the adaptable bin of FIG. 1, shown with the cups removed to illustrate the rotating cup holders, which are in an expanded state.
Figure 3:
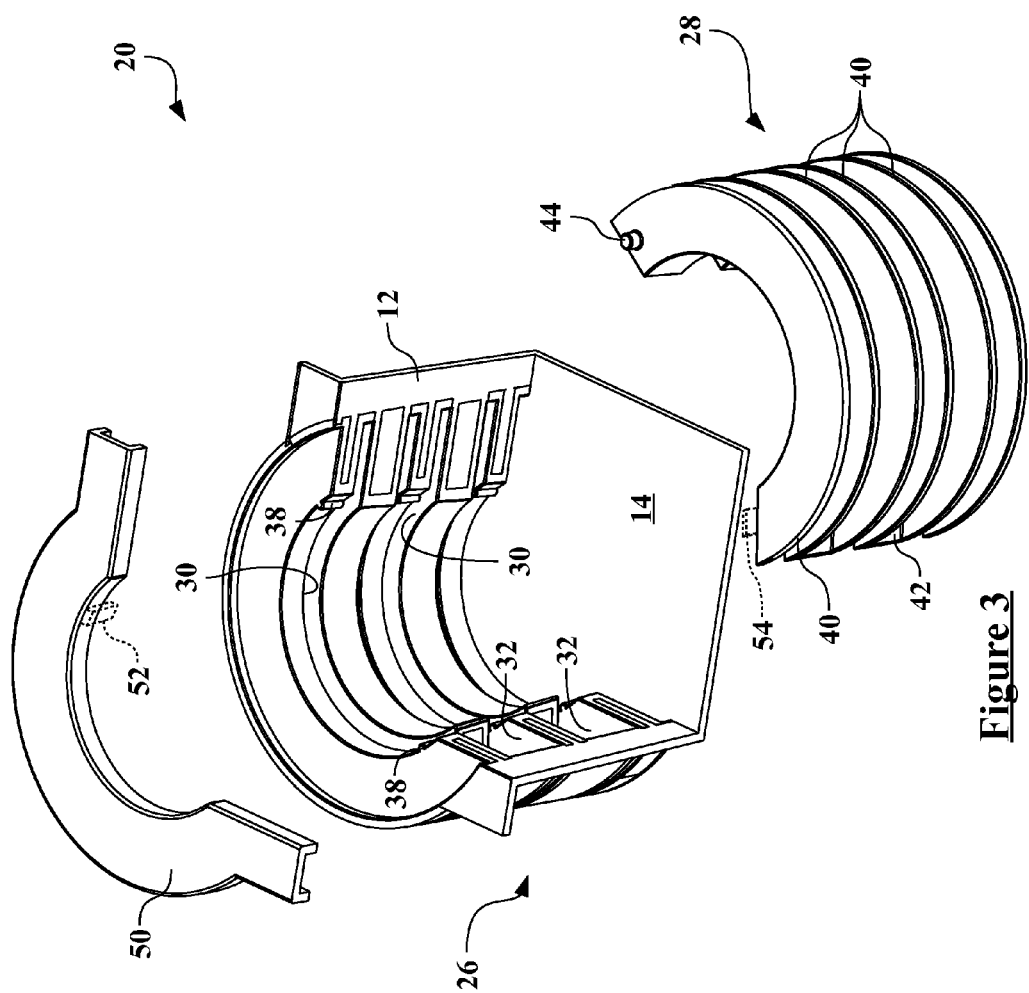
FIG. 3 is a schematic exploded view of one cup holder.

Referring to FIG. 2A, FIG. 2B, and FIG. 3, and with continued reference to FIG. 1, there are shown additional views of portions of the adaptable bin 10 and the cup holders 20. FIG. 2A shows the cup holders 20 in the collapsed state or stowed position. FIG. 2B shows the adaptable bin 10 with the cup holders 20 in the expanded state or deployed position. FIG. 3 shows an exploded view of the components forming one of the cup holders 20. Elements and components of the cup holders 20 will be described interchangeably with reference to FIGS. 2A, 2B, and 3.

A static sidewall 26 may be formed as part of the bin wall 12. The static sidewall 26 at least partially forms or defines the cup holder 20. A dynamic sidewall 28 also at least partially forms or defines the cup holder 20. The dynamic sidewall 28 is selectively rotatable between the collapsed state, in which it is substantially withdrawn from the storage volume 16, and the expanded state, in which it is forming part of the cup holder 20 and is within the storage volume 16. In the configuration shown, the dynamic sidewall 28 rotates substantially about the axis 22 between the collapsed state and the expanded state.

The static sidewall 26 includes a plurality of guide tracks 30 and at least one landing support 32 between the plurality of guide tracks 30. The static sidewall 26 also includes a pin slot 34, which is formed above the dynamic sidewall 28 in the configuration shown, but may be formed elsewhere. The pin slot 34 is hidden from view in FIGS. 2A, 2B, and 3, but its approximate location is illustrated with dashed lines.

To provide resistance at specific points or states of rotation, the static sidewall 26 has a pin detent 36 formed in at least one end of the pin slot 34. The static sidewall 26 also has at least one static detent 38 feature. The pin detent 36 and static detent 38 are hidden from view in FIGS. 2A, 2B, and 3, but are shown in subsequent figures.

The dynamic sidewall includes a plurality of ribs 40. When assembled, as shown in FIGS. 2A and 2B, the ribs 40 are slidably disposed within the guide tracks 30 of the static sidewall 26. The ribs 40 are substantially within the guide tracks 30 when the cup holder 20 is in the collapsed state but extend away from the guide tracks 30 and into the storage volume 16 when in the expanded state.

At least one end connector 42 links adjacent pairs of the ribs 40. The end connector rests on, or otherwise interfaces with, the landing support 32 of the static sidewall 26 when the in the expanded state.

In the configuration of the adaptable bin 10 shown in FIGS. 2A and 2B, the dynamic sidewalls 28 rotate in opposing directions, such that the cup holder 20 on the left in the figures rotates counterclockwise but the cup holder 20 on the right rotates clockwise. Alternatively, each of the cup holders 20 may be configured such that the dynamic sidewalls 28 always rotate in the same direction. Sharing common rotation may allow, for example, all four of the cup holders 20 shown in FIG. 1 to be manufactured and assembled from identical components, without any mirroring or reversing of individual components.

The dynamic sidewall 28 further includes a pin 44 configured to move through the pin slot 34 as the dynamic sidewall 28 moves between the collapsed state and the expanded state. The pin 44 is hidden from view in FIGS. 2A, 2B, and 3, but its approximate location is illustrated with dashed lines. The pin 44 of the dynamic sidewall 28 engages with the pin detent 36 of the pin slot 34 as the dynamic sidewall 28 moves into the expanded state. This interaction helps hold the dynamic sidewall 28 in the expanded state.

A plurality of rib walls 46 are disposed between the ribs 40. The rib walls 46 provide structural support for the dynamic sidewall 28 and also provide additional contact surface area between the dynamic sidewall 28 and the cup 18.

The dynamic sidewall 28 includes at least one dynamic detent 48, which is configured to engage with the static detent 38 as the dynamic sidewall 28 moves into the expanded state. The dynamic detent 48 may also engage with another static detent 38 as the dynamic sidewall 28 moves back into the collapsed state, such that it is locked or held in either position. The dynamic detents 48 are hidden from view in FIGS. 2A, 2B, and 3, but are shown in subsequent figures.

The pin slot 34 may be formed either within a continuous portion of the static sidewall 26. Alternatively, and as illustrated in FIGS. 2A and 2B, the pin slot 34 may be formed within a top plate 50, which is a separate component. The top plate 50 is mated to the static sidewall 26 above the dynamic sidewall 28. The pin detent 36 may also be formed within top plate 50.

FIG. 3 illustrates some additional features that may be included with the cup holder 20. The top plate 50 may also include a restraint tab 52 (shown in dashed lines) extending downward (as viewed in the figures) over a portion of the dynamic sidewall 28. The restraint tab 52 provides an additional point of control to align and maintain the dynamic sidewall 28 within the guide channels 30 as the dynamic sidewall moves between the collapsed and expanded states. A pull tab 54 (shown in dashed lines) may be formed on the dynamic sidewall 28, and facilitates movement by providing a grab point or finger hold for the operator wishing to move the dynamic sidewall 28 and adjust the cup holder 20 between the collapsed and expanded states.

Referring now to FIG. 4, and with continued reference to FIGS. 1-3, there is shown a top view of the adaptable bin 10 illustrated the pin slot 34. FIG. 4 shows one of the cup holders 20 expanded (the lower cup holder 20, as viewed in the figure) and the other collapsed.

FIG. 4 illustrates the pin slot 34 and the movement of the pin 44 there through. Furthermore, FIG. 4 shows that the pin slot 34 may include two pin detents 36, one set at either end of the pin slot 34. The pin slot 34 may be formed in either the static sidewall 26 or the top plate 50. Therefore, depending upon the configuration of the adaptable bin 10, FIG. 4 may be showing the cup holders 20 with the top plate 50 removed completely or with only a portion of the top plate 50 removed to expose the pin slot 34.

When the dynamic sidewall 28 is in the collapsed state, the pin 44 is snapped into one of the pin detents 36, keeping the dynamic sidewall 28 from unintentionally sliding or rotating to the expanded state, such as during movement of the vehicle. Similarly, when the dynamic sidewall 28 is in the expanded state, the pin 44 is snapped into another of the pin detents 36, keeping the dynamic sidewall 28 from unintentionally sliding or rotating to the collapsed state, which could cause the cup 18 to become loose.

As illustrated in FIG. 4, the dynamic sidewall 28 of the cup holder 20 may rotate approximately 165-175 degrees between the collapsed state and the expanded state. More particularly, the dynamic sidewall 28 rotates approximately 170 degrees to move the end connector 42 into contact with the landing supports 32 of the static sidewall 26.

Referring now to FIG. 5, and with continued reference to FIG. 1-4, there is shown a top view of a portion of the adaptable bin 10. FIG. 5 also shows one of the cup holders 20 expanded and the other collapsed.

FIG. 5 illustrates interaction of the dynamic detents 48 of the dynamic sidewall 28 with the static detents 38 of the static sidewall 26. As the dynamic sidewall 28 moves into either the expanded state or the collapsed state, the dynamic detents 48 and the static detents 38 engage, thus further restricting unintentional movement of the dynamic sidewall 28. Note that the shapes of the dynamic detents 48 and corresponding static detents 38 may be reversed, as long as the two elements provide some locking resistance to maintain the dynamic sidewall 28 in either the collapsed state or the expanded state.

The detailed description and the drawings or figures are supportive and descriptive of the invention, but the scope of the invention is defined solely by the claims. While some of the best modes and other embodiments for carrying out the claimed invention have been described in detail, various alternative designs, configurations, and embodiments exist for practicing the invention defined in the appended claims.

The invention claimed is:

1. A rotating cup holder, comprising:
   a static sidewall forming part of the cup holder, wherein the static sidewall includes:
      a plurality of guide tracks; and
      a landing support between the plurality of guide tracks; and
   a dynamic sidewall forming part of the cup holder, wherein the dynamic sidewall is rotatable between a collapsed state substantially within the static sidewall and an expanded state, and includes:
      a plurality of ribs slidably disposed within the guide tracks of the static sidewall in the collapsed state and extending away from the guide tracks in the expanded state; and
      at least one end connector linking an adjacent pair of the ribs, wherein the end connector rests on the landing support of the static sidewall in the expanded state.

2. The cup holder of claim 1,
   wherein the static sidewall further includes a pin slot; and
   wherein the dynamic sidewall further includes a pin configured to move through the pin slot as the dynamic sidewall moves between the collapsed state and the expanded state.

3. The cup holder of claim 2, further comprising:
   a top plate mated to the static sidewall above the dynamic sidewall, wherein the pin slot is formed in the top plate.

4. The cup holder of claim 3,
   wherein the top plate further includes a pin detent formed at one end of the pin slot; and
   wherein the pin of the dynamic sidewall engages with the pin detent as the dynamic sidewall moves into the expanded state.

5. The cup holder of claim 4, wherein the top plate further includes a restraint tab extending over a portion of the dynamic sidewall.

6. The cup holder of claim 5,
   wherein the static sidewall further includes at least one static detent; and
   wherein the dynamic sidewall includes at least one dynamic detent which engages with the static detent as the dynamic sidewall moves into the expanded state.

7. The cup holder of claim 6, wherein the dynamic sidewall rotates approximately 165-175 degrees between the collapsed state and the expanded state.

8. An adaptable bin having a first cup holder, comprising:
   a bin floor;
   a bin wall;
   a static sidewall defining part of the bin wall and defining part of the first cup holder, wherein the static sidewall includes:
      a plurality of guide tracks; and
      a landing support between the plurality of guide tracks;
   a storage volume defined by the bin wall and the bin floor, wherein the first cup holder is partially within the storage volume;
   a dynamic sidewall rotatable between a collapsed state substantially withdrawn from the storage volume and an expanded state within the storage volume, and defining part of the first cup holder, wherein the dynamic sidewall includes:
      a plurality of ribs slidably disposed within the guide tracks of the static sidewall in the collapsed state and extending away from the guide tracks in the expanded state; and
      at least one end connector linking an adjacent pair of the ribs, wherein the end connector rests on the landing support of the static sidewall in the expanded state.

9. The adaptable bin of claim 8, further comprising:
   a top plate mated to the static sidewall above the dynamic sidewall, wherein the top plate further includes:
      a pin slot; and
      a pin detent formed at one end of the pin slot,
   wherein the dynamic sidewall further includes a pin configured to move through the pin slot as the dynamic sidewall moves between the collapsed state and the expanded state and which engages with the pin detent as the dynamic sidewall moves into the expanded state.

10. The adaptable bin of claim 9, wherein the top plate further includes a restraint tab extending over a portion of the dynamic sidewall.

11. The adaptable bin of claim 10, wherein the dynamic sidewall rotates approximately 165-175 degrees between the collapsed state and the expanded state.

* * * * *